J. D. C. Carpenter,
Hanging Saws.
Nº 21,651.    Patented Oct. 5, 1858.
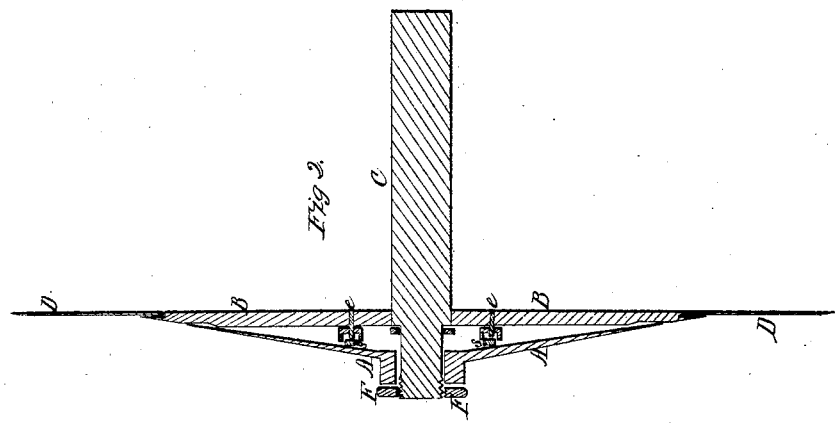
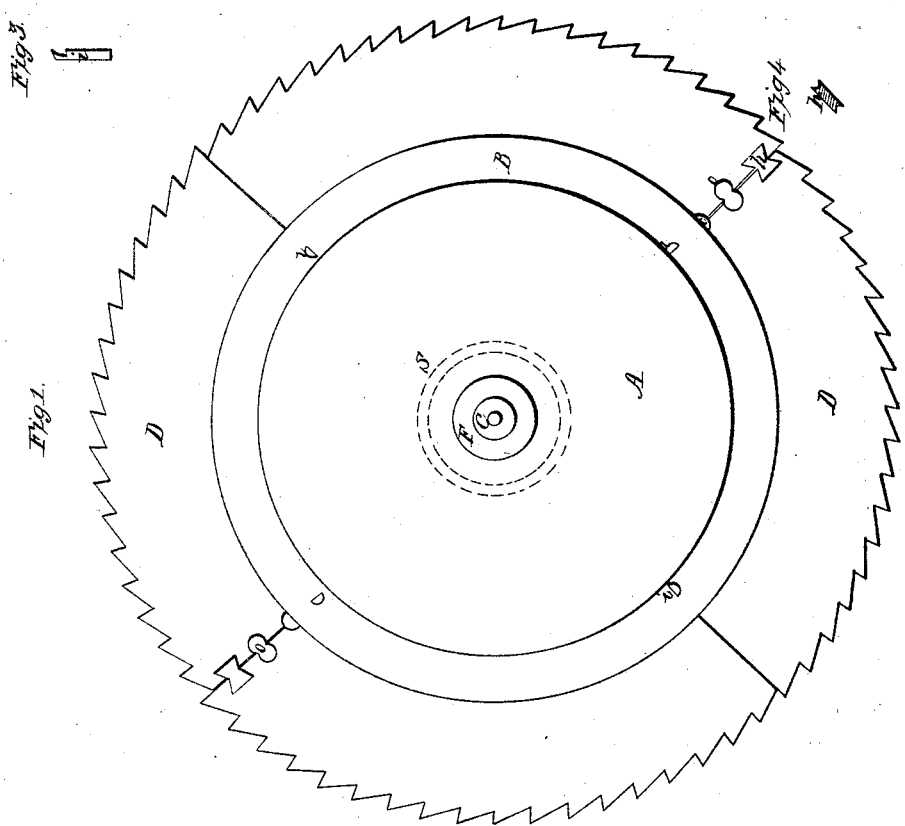

UNITED STATES PATENT OFFICE.

J. D. C. CARPENTER, OF CINCINNATI, OHIO.

DEFLECTING-PLATE OF CIRCULAR SAWS.

Specification of Letters Patent No. 21,651, dated October 5, 1858.

*To all whom it may concern:*

Be it known that I, J. D. C. CARPENTER, of Cincinnati, in the county of Hamilton and State of Ohio, have invented new and useful Improvements in Circular Saws; and I do hereby declare that the following is a full and exact description thereof, reference being had to the accompanying drawings and to the letters of reference marked thereon.

My invention consists of a rotary spreader or deflecting plate for circular saws, together with a small chisel or cutter in the side of the saw, and a link or key for connecting the segments.

In the accompanying drawings Figure 1, is a side view of my saw, showing the deflecting plate. Fig. 2, is a section through my saw, saw shaft and deflecting plate. Fig. 3, is a view of one of the small cutters or chisels, detached from the side of the saw. Fig. 4, is a section of one of the keys for connecting the segments.

My saw, Fig. 1, of the accompanying drawings, is made of a central flange B, of cast iron, to which the segments D, are fastened by screws in the usual manner. The flange B, is very thick and will have curved ribs cast upon its convex side, in order to stiffen the flange without straining the metal in cooling. Near the center of this flange is an annular groove or bearing into which a ring $s$, of Babbitt metal is inserted. This ring is made adjustable by means of the screws $e$.

The deflecting plate A may be cast with ribs on its concave side, and it is to have an annular bearing to meet the ring $s$. It is held upon the saw shaft C, by a nut F, and yet is capable of revolving upon said shaft, but by the action of the screw $e$, the ring $s$, is pressed against the flange A, so as to prevent such revolution when the saw runs free. Therefore the saw and plate A, revolve together when the saw first enters the lumber. As the saw advances and the end of the board begins to press against the plate A, the motion of said plate is retarded, and if the pressure of the board be sufficient the friction of the ring $s$, is overcome and the plate A then becomes a stationary deflector. This rotary motion of the plate A, facilitates the entrance of the latter behind the board and brushes away any splinters which might interfere with the operation of the saw. For this same purpose I employ one or more cutters or chisels $i$, (Figs. 1, and 3,) inserted in the flange B, near the margin of the plate A. These cutters will effectually remove the small splinters and also slightly bevel the edge of the board so as to insure the free entrance of the deflector A.

The segments D, are connected by keys or links either riveted in a countersink, or dovetailed at their edges, as shown in Fig. 4, so as to embrace the edge of the segment. These keys may be of various forms, as seen at $h$, Fig. 1, and at $o$, $o$. They stiffen the segments so that the latter may be made very wide and thus, not only wear longer but also facilitate the operation of the spreader.

It is obvious that the details of my saw may be somewhat varied, without departing from the spirit of my invention, and therefore I do not confine myself to the exact construction herein described.

I am aware that a stationary convex deflecting plate is an old device and that a central convex flange armed with segments to form a circular saw has also been made but I believe that my invention of a rotary convex deflecting plate separate from the saw proper, is new and very different from those devices in its operation.

Having thus fully described my invention, what I claim and desire to secure by Letters Patent of the United States is:

1. The rotary deflecting plate or spreader A, provided with an adjustable friction bearing $s$, substantially as set forth.

2. I claim the cutters $i$, placed near the margin of the deflecting plate A, substantially as set forth.

J. D. C. CARPENTER.

Witnesses:
  EDW. F. BROWN,
  DANIEL BREED.